United States Patent [19]

Peiffer et al.

[11] Patent Number: 4,978,461
[45] Date of Patent: Dec. 18, 1990

[54] LOW AND HIGH TEMPERATURE DRILLING FLUIDS BASED ON SULFONATED TERPOLYMER IONOMERS

[75] Inventors: Dennis G. Peiffer, East Brunswick; Robert D. Lundberg, Bridgewater, both of N.J.; John C. Newlove, Kingwood; Eugen R. Werlein, Simonton, both of Tex.

[73] Assignee: Exxon Research and Engineering Company, Florham Park, N.J.

[21] Appl. No.: 325,423

[22] Filed: Mar. 20, 1989

Related U.S. Application Data

[63] Continuation of Ser. No. 902,772, Sep. 2, 1986, abandoned, which is a continuation-in-part of Ser. No. 725,362, Apr. 19, 1985, abandoned.

[51] Int. Cl.$^5$ ............................................... C09K 7/06
[52] U.S. Cl. .............................. 252/8.511; 252/8.515
[58] Field of Search ........................... 252/8.511, 8.515

[56] References Cited

U.S. PATENT DOCUMENTS

| H495 | 7/1988 | Peiffer et al. | 252/8.515 |
| 2,650,905 | 9/1953 | Fordyce et al. | 252/8.51 |
| 4,425,455 | 1/1984 | Turner et al. | 252/8.515 |
| 4,425,461 | 1/1984 | Turner et al. | 252/8.515 |
| 4,537,688 | 8/1985 | Peiffer et al. | 252/8.515 |
| 4,647,603 | 3/1987 | Lunderg et al. | 523/339 X |
| 4,740,319 | 4/1988 | Patel et al. | 252/8.515 |

FOREIGN PATENT DOCUMENTS 0072245 2/1983 European Pat. Off. .

Primary Examiner—Robert L. Stoll
Assistant Examiner—Chhaya Sayala
Attorney, Agent, or Firm—Richard E. Nanfeldt

[57] ABSTRACT

The present invention relates to sulfonated thermoplastic terpolymers which are terpolymers of p-methyl styrene, styrene and sodium styrene sulfonate wherein these sulfonated terpolymers function as viscosification agents when added to oil-based drilling muds which are the fluids used to maintain pressure, cool drill fits and lift cuttings from the holes in the drilling operation for oil an gas wells. The sulfonated thermoplastic terpolymer of the latex have about 5 to about 100 meq. of sulfonate groups per 100 grams of the sulfonated thermoplastic terpolymer, wherein the sulfonated groups are neutralized with a metallic cation or an amine or ammonium counterion. A polar cosolvent can optionally be added to the mixture of oil drilling mud and sulfonated thermoplastic polymer, wherein the polar cosolvent increases the solubility of the sulfonated thermoplastic terpolymer in the oil drilling and by decreasing the strong ionic interactions between the sulfonate groups of the sulfonated polymer.

The drilling muds formed from these lattices of the sulfonated thermoplastic terpolymers exhibits markedly improved low and high temperature rheological properties as compared to drilling muds formed from sulfonated thermoplastic copolymers.

14 Claims, No Drawings

LOW AND HIGH TEMPERATURE DRILLING FLUIDS BASED ON SULFONATED TERPOLYMER IONOMERS

This is a continuation of application Ser. No. 902,772, filed Sep. 2, 1986, now abandoned, which is a continuation-in-part of Ser. No. 725,362 filed Apr. 19, 1985, now abandoned.

FIELD OF THE INVENTION

The present invention relates to sulfonated thermoplastic polymers which are terpolymers of styrene/p-methyl styrene and sodium styrene sulfonate, wherein these sulfonated polymers function as viscosification agents when added to oil-based drilling muds which are the fluids used to maintain pressure, cool drill bits and lift cuttings from the holes in the drilling operation for oil and gas wells. The sulfonated thermoplastic terpolymers of the latex have about 5 to about 100 meq. of sulfonate groups per 100 grams of the sulfonated thermoplastic polymer, wherein the sulfonated groups are neutralized with a metallic cation or an amine or ammonium counterion. A polar cosolvent can optionally be added to the mixture of oil drilling mud and sulfonated thermoplastic terpolymer, wherein the polar cosolvent increases the solubility of the sulfonated thermoplastic polymer in the oil drilling mud by decreasing the strong ionic interactions between the sulfonate groups of the sulfonated polymer.

BACKGROUND OF THE INVENTION

In the field of drilling in the exploration for oil and gas, an important component is that of the formulation of drilling muds. Drilling muds are the fluids which are used to maintain pressure, cool drill bits and lift cuttings from the holes and vary in composition over a wide spectrum. Generally, drilling muds are based on aqueous formulations or oil-based formulations.

The drilling muds formed from these lattices of the sulfonated thermoplastic terpolymers exhibit markedly improved low and high temperature rheological properties as compared to drilling muds formed from sulfonated thermoplastic copolymers.

A conventional oil-based drilling mud formulation is comprised of basically the following ingredients: oil (generally No. 2 diesel fuel), emulsifying agents (alkaline soaps and fatty acids), wetting agents (dodecylbenzene sulfonate), water, barite or barium sulfate, (weighting agent), asbestos (employed as viscosification agent) and/or, amine-treated clays (also as viscosification agent).

The above combination of ingredients is generally formulated to possess various weights based primarily on amount of barite added. For example, a typical drilling mud can vary in specific gravity from a range of about 7 pounds per gallon up to 17 pounds per gallon or even greater. This variation in specific gravity is primarily controlled by the amount of barite added. The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formulation. The use of the oil-based formulations circumvents this problem. However, it is observed that the current oil-based drilling muds have some significant disadvantages. One disadvantage is that the incorporation of asbestos or asbestos fines can incur significant health problems, both during the mud formulation and potentially during the subsequent use of such formulations. Therefore, it is desirable to eliminate the use of asbestos completely in such drilling muds. On the other hand, the use of substitutes for asbestos in this application has heretofore not been particularly successful in that the resulting viscosification agents must maintain adequate viscosities under the drilling conditions which can involve high temperature and high shear conditions.

There has been a substantial need for a drilling fluid which would exhibit good performance at low and high temperature in water sensitive formations. Past experience has shown that oil-based drilling fluids can provide good performance in water sensitive formations, and the state of the art systems can perform well up too about 350° F. Typically, in such formations, the failure of the viscosities in current muds is circumvented by the addition of more viscosifier during the circulation of the drilling mud. While this solution is adequate at moderate temperatures, when much higher temperatures are encountered (example: geothermal wells or natural gas wells), the degradation of the viscosifier can be so rapid that the additional costs for a viscosifier can be uneconomical. There is a need, therefore, for drilling fluids which can maintain their viscosity and gel strength at temperatures up to and exceeding 400° F. These needs are not adequately met by the current drilling fluids, even with the oil-based drilling muds often employed.

The instant invention will describe a family of viscosifiers suitable for oil-based drilling muds which offer thermal stability over a very broad temperature range, which appears to go far beyond that offered by state-of-the-art drilling muds. The types of viscosifiers employed currently in oil-base drilling muds typically are asbestos or amine coated clays. Such systems provide adequate gel strength (i.e., the ability to suspend solids) at temperatures up to 300° F.

We have previously shown that lightly sulfonated polystyrene is very effective as a viscosifier for oil-based drilling muds. We have found that sulfo-polystyrene provides good viscosification characteristics at temperatures exceeding 150° F. when formulated in mud based on saturated salt water. Higher temperatures (300°,400° F.) encountered in accelerated aging studies for 15 hours have shown that sulfo-polystyrene enhances its efficacy at those higher temperatures. However, at low temperatures (<150° F.), sulfo-polystyrene was not an effective viscosifier. That is, the drilling mud containing this polymer needed to be "thermally activated" before acceptable rheological properties were attained. However, based on available information, it appeared that until that time, there was no viscosifier which was effective at temperatures around 400° F. for the typical aging period of 16 hours. The instant invention will describe polymeric materials capable of providing excellent rheological properties, specially gel strength, at low and high temperatures (400° F.) These materials may be effective at even high temperatures.

In U.S. Serial No. 547,906 filed on Nov. 2,1983, the use of terpolymers of styrene/t-butyl styrene/metal styrene sulfonate were disclosed for use in drilboxy fluids. The terpolymers of p-methyl styrene/styrene/metal styrenesulfonate besides being substantial cheaper to produce than the terpolymer of styrene/metal styrene sulfonate/t-butyl styrene also exhibit improved fluid loss properties.

The mechanism through which this new family of sulfonated terpolymer ionomers is operative is not completely understood. The preferred species of these materials is lightly sulfonated styrene: methyl styrene: styrene terpolymers with a sulfonate level running from about 1 mole % up to about 4 mole % based on current data. It is believed that this polymer is marginally soluble in the hydrocarbon phase and completely insoluble in the aqueous phase of a formulated mud and, therefore, the polymer is probably located at the interface. As a consequence, this polymer is an extremely effective viscosifier even at quite low levels.

The instant invention discloses a class of sulfonated thermoplastic terpolymers which are effective viscosifiers at both room temperature and 400° F. These sulfonated thermoplastic polymers are terpolymers of p-methyl styrene/styrene/sodium styrene sulfonate. These terpolymers provide excellent gel strengths at both room temperature and 400° F.

A second facet of the instant invention relates to the use of these materials in formulations which employ high concentrations of salt in the aqueous phase. The sulfonated terpolymers of this invention do not lose some of their efficacy in salt water. It has been found that the use of a suitable nonionic emulsifier with the sulfonated terpolymers is not required in the formulations to be are effective with salt water. Therefore, these terpolymers give formulations which perform well at high temperatures and in the presence of salt water phases, which is a highly desired objective in the drilling fluids industry.

SUMMARY OF THE INVENTION

The present invention relates to sulfonated thermoplastic polymers which are terpolymers of p-methyl styrene, styrene and sodium styrene sulfonate, wherein these sulfonated terpolymers function as viscosification agents when added to oil-based drilling muds which are the fluids used to maintain pressure, cool drill bits and lift cuttings from the holes in the drilling operation for oil and gas wells. The sulfonated thermoplastic terpolymers have about 5 to about 100 meq. of sulfonate groups per 100 grams of the sulfonated thermoplastic terpolymer, wherein the sulfonated groups are neutralized with a metallic cation or an amine or ammonium counterion. A polar cosolvent can optionally be added to the mixture of oil drilling mud and sulfonated thermoplastic polymer, wherein the polar cosolvent increases the solubility of the sulfonated thermoplastic polymer in the oil drilling mud by decreasing the strong ionic interactions between the sulfonate groups of the sulfonated terpolymer.

GENERAL DESCRIPTION OF THE INVENTION

The present invention describes a new class of viscosification agents for oil-based drilling muds which are used during operation of gas an oil wells, wherein these viscosification agents are terpolymers of p-methyl styrene/styrene/sodium styrene sulfonate. The oil-based drilling muds of the instant invention minimally comprise, but can also include other additives; an organic liquid such as an oil, fresh water or salt water, an emulsifier, a wetting agent, a weighting material and a sulfonated thermoplastic terpolymer. In general, the oil-based drilling mud has a specific gravity of about 7 pounds per gallon to about 20 pounds per gallon, more preferably about 12 to about 16. A typical oil-based drilling mud, as envisioned by the instant invention, comprises: an oil; about 1 to about 10 parts by weight of water per 100 parts by weight of the oil, more preferably about 3 to about 5; and 20 to about 50 lb/bbl. of an emulsifier and/or supplementary emulsifier; about ½ to about 5 lb/bbl. of a wetting agent and weighting material (barium sulfate or barite) necessary to give the desired mud density; which comprises less than about 800 lb/bbl. of barium sulfate, more preferably about 5 to about 750, and most preferably about 10 to about 700; and about 0.25 to about 4 lb/bbl. of the sulfonated elastomeric polymer.

The oil employed in the oil-based drilling mud is generally a No. 2 diesel fuel, but it can be other commercially available hydrocarbon solvents such as kerosene, fuel oils or selected crude. If crudes are used, they should be weathered and must be free of emulsion breakers.

Typical, but non-limiting examples of suitable emulsifiers which can be readily employed are magnesium or calcium soaps of fatty acids.

Typical, but non-limiting examples of a suitable wetting agent which can be readily employed is an alkylaryl sulfonate.

Typical, but non-limiting examples of a weighting material which can be readily employed is barite or a barium sulfate which may optionally be surface-treated with other cations, such as calsium.

The latex of the neutralized sulfonate-containing terpolymers are formed by a free radical copolymerization process. The monomers used in the free radical emulsion terpolymerization process are styrene monomer and tert-butylstyrene, which are terpolymerized with sulfonate-containing styrene monomer.

In general, the styrene p-methylstyrene and sulfonate-containing styrene monomer are dispersed in a water phase in the presence of an initiator and a suitable surfactant, wherein the temperature is sufficient to initiate polymerization. The resultant latex is added to the drilling mud formulation at about 0.5 to about 20 lb/bbl., wherein the latex contains about 20 to about 50 weight percent of the sulfonate-containing polymer.

The sulfonate-containing polymers formed from the free emulsion copolymerization process of the instant invention can be generally described as having an Mn as measured by GPC of about 5,000 to about 200,000, more preferably about 10,000 to about 100,000. The sulfonate-containing polymers of the instant invention contain about 5 to about 100 meq. of sulfonate groups per 100 grams of polymer, more preferably about 18 to about 90, and most preferably about 20 to about 80. The sulfonate-containing terpolymer which is formed by the instant, free radical emulsion copolymerization process is a p-methylstyrene, styrene-sodium styrene sulfonate terpolymer.

The neutralized sulfonated terpolymers employed in the oil-based drilling muds are formed by a free radical process. The solid sulfonated thermoplastic terpolymers of the instant invention comprises less than about 99 percent by weight of styrene, at least 1% by weight of p-methyl styrene and a minor proportion of a metal or amine neutralized sulfonate monomer characterized by the formulae:

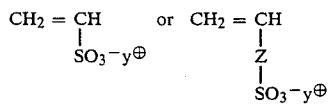

wherein Z is phenyl or

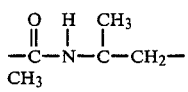

and wherein Y$^+$ is a cation selected from Groups IA, IIA, IB and IIB of the Periodic Table or an amine of the formula:

where $R_1$, $R_2$ and $R_3$ an be aliphatic groups of $C_1$ to $C_{12}$ or hydrogen, the terpolymer being water insoluble having about 5 to about 100 meq. of sulfonate groups per 100 grams. Particularly suitable metal cations are sodium, potassium and zinc, and an especially preferred metal cation is sodium. A typical, but non-limiting example of suitable sulfonate-containing monomers is:

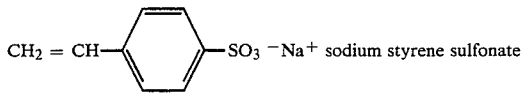

The sulfonate-containing monomers of the instant invention which ar water soluble can be generally described as a monomer having unsaturation and a metal or amine sulfonate group.

An especially preferred sulfonate-containing monomer is metal styrene sulfonate. The molar ratio of sulfonate-containing monomer to t-butyl styrene and styrene monomers is about 1/200 to about 1/5, more preferably about 1/150 to about 1/6, and most preferably about 1/100 to about 1/9.

The monomers used in the free radical emulsion copolymerization process are p-methyl styrene and styrene which are copolymerized with sulfonate-containing monomers.

In general, the p-methyl styrene with styrene and sulfonate-containing monomer are dispersed in a water phase in the presence of a suitable free radical initiator and a suitable surfactant, wherein the temperature is sufficient to initiate polymerization. The resultant latex is coagulated, usually by the addition of an aqueous salt solution, and the recovered terpolymer is washed with water and subsequently dried under vacuum at room temperature. Alternatively, the latex can be coagulated by the addition of methanol.

The sulfonated thermoplastic terpolymers formed from the free radical emulsion copolymerization process of the instant invention can be generally described as having an $M_n$ as measured by GPC of about 5,000 to about 200,000, more preferably about 10,000 to about 100,000. The terpolymers of the instant invention contain about 18 to about 100 meq. of sulfonate groups per 100 grams of polymer, more preferably about 18 to about 90, and most preferably about 20 to about 80. Furthermore the terpolymers of the instant invention contain about 5 to about 90 mole % of p-methylstyrene groups, more preferably about 10 to about 75 mole %, and most preferably about 20 to 45 mole %.

A variety of free radical catalysts can be employed in this invention including the water soluble varieties, potassium persulfate, ammonium persulfate, etc. and the oil/water soluble redox couples such as benzoyl peroxide/$(NH_4)_2FeSO_4$.

The surfactants employed for this invention are varied and well-known in the art. The typical emulsifiers or surfactants can be employed; however, some are more effective than others in generating lattices of better stability. A preferred emulsifier is sodium lauryl sulfate.

Buffering agents can be used but are not necessary in the instant polymerization process. If used, they are selected from the group consisting of sodium carbonate, ammonia, sodium acetate, trisodium phosphate, etc. These buffering agents are employed at a concentration of about 0.1 to about 5 grams per 100 grams water employed in the emulsion system.

Chain transfer agents can be readily employed in the instant polymerization process for controlling the molecular weight of the resultant terpolymer. The concentration of chain transfer agent is from 0 to about 1.0 grams per 100 grams of the combined weight of the sulfonate-containing monomer and the styrene and t-butyl styrene monomers.

The free radical emulsion copolymerization of the water soluble sulfonate-containing monomer, water-insoluble styrene and the p-methylstyrene monomers yields a stable latex, wherein the resultant water insoluble terpolymer is not covalently cross-linked, and possesses substantial ionic cross-linking, and has about 5 to about 100 meq. of sulfonate groups per 100 grams of polymer, more preferably about 18 to about 90. The resultant latex can be coagulated by the addition of an aqueous salt solution to the emulsion at a volume ratio of the aqueous salt solution to total volume of the emulsion of about 10 to about 0.5, more preferably about 3 to about 0.7, and most preferably about 2 to about 1. The water insoluble terpolymer is recovered by filtration and substantially washed with water and dried under vacuum conditions. Alternatively, the polymer can be coagulated by precipitation with alcohol such as methanol.

DETAILED DESCRIPTION OF THE PREFERRED EMBODIMENTS

The following examples illustrate the present invention without; however, limiting the same hereto.

Example 1

The terpolymer lattices are prepared by emulsion techniques that allow incorporation of sodium styrene sulfonate into styrene and methylstyrene to form the ion-containing material. A representative example is outlined below.

Into a four-neck flask, we add:
- 31.2 styrene (95 mole %)
- 1.9 g p-methylstyrene (5 mole %); PMS
- 120 ml. distilled water
- 2.0 g sodium styrene sulfonate
- 3.2 g sodium lauryl sulfate
- 0.2 g potassium persulfate
- 0.05 g dodecylthiol The dodecylthiol is a chain transfer agent used to control molecular weight. The flask is flushed with nitrogen, vigorously stirred and heated to 50° C. for 24 hours. The resulting stable emulsion, containing approximately 35 mole % PMS, was short stopped with hydroquinone and cooled to room temperature. This emulsion was used directly in the drilling fluid formulation (designated 113A).

Example 2

The level of para-methylstyrene in the polymer can be modified through changes in the concentration of the monomer in the initial polymerizing mixture. For example, a terpolymer containing approximately 50 mole % p-methylstyrene (PMS) is formed with only a relatively small change in the styrene and PMS monomer concentration in the previously described (Example 1) formulation. This is:

23.7 g styrene (50 mole %)
27.0 p-methylstyrene (50 mole %)

Again, the resultant latex solution is used directly in the drilling fluid formulation (designated 113B).

Example 3

The level of para-methyl styrene in the polymer can be again modified through changes in the concentration of the monomer in the initial polymerizing mixture. For example, a terpolymer containing approximately 75 mole % p-methylstyrene is formed with only a modest change in the styrene and PMS monomer concentration as in the previously described (Example 1) formulation. That is:

11.3 g styrene (25 mole %)
39.0 g p-methylstyrene (75 mole %)

Again, the resultant latex solution is used directly in the drilling fluid formulation (designated 113C).

Example 4

The level of para-methyl styrene in the polymer can be again modified through changes in the concentration of the monomer in the initial polymerizing mixture. For example, a terpolymer containing 100 mole % p-methylstyrene (PMS) is formed with change in the PMS monomer concentration in the previously described (Example 1) formulation. That is:

50.0 p-methylstyrene (100 mole %)

Again, the resultant latex solution is used directly in the drilling fluid formulation (designated 113D).

Example 5

An oil-based drilling mud was prepared by conventional laboratory methods. The mud contained #2 diesel oil, fresh or calcium chloride water, emulsifier, supplementary emulsifier, a wetting agent, sulfonated styrene: styrene: para-methyl styrene terpolymer and weighting material. The mud was aged at 300° F. for 21 hours and 4 days at room temperature. The cells were cooled to room temperature, depressurized and then the rheological properties of the mud were measured on a Fann Model 35 viscometer at 115° F. It should be noted that these terpolymers were evaluated in "oilfaze" mud systems at 12 lb./gal.

Table 1 shows the effectiveness of the four sulfonated terpolymers (described in Examples 1-3) in an oil mud system. These results are directly compared with the base mud (control) and a mud containing sulfonated polystyrene (SPS). The data clearly confirms that the rheology properties of the SPS mud is substantially improved over the base mud system, except with regard to the high E.S. and F.L. (fluid loss) values—a detrimental feature of this mud system. The overall rheological properties of the muds containing para-methylstyrene ionomers are improved over a broad temperature range, i.e. up to at least 450° F. as compared to the base mud and muds containing SPS. We believe this is due to the improved solubility of the terpolymer ionomer in the oil phase.

TABLE I

PARA-METHYLSTYRENE TERPOLYMER IONOMER/OIL MUD RHEOLOGY*

| Rheology (115° F.) | Control | SPS | Ex. 1 | Ex. 2 | Ex. 3 | Ex. 4 |
|---|---|---|---|---|---|---|
| 600 | 75 | 110 | 148 | 146 | 130 | 134 |
| 300 | 46 | 72 | 100 | 98 | 86 | 88 |
| 200 | 36 | 57 | 82 | 80 | 69 | 71 |
| 100 | 24 | 39 | 58 | 57 | 48 | 49 |
| 6 | 7 | 14 | 26 | 25 | 20 | 18 |
| 3 | 6 | 13 | 24 | 23 | 18 | 16 |
| 10 Sec. Gel. | 8 | 18 | 28 | 28 | 24 | 18 |
| E.S. | 400 | | 600 | | 560 | |
| F.L. | 0.0 | 3.1 | 22.6 | 9.9 | 13.7 | 0.0 |
| AV | 37 | 55 | 74 | 73 | 65 | 67 |
| PV | 29 | 38 | 48 | 48 | 44 | 46 |
| YP | 17 | 34 | 52 | 50 | 42 | 42 |

*Aged 21 hours at 300° F. and 4 days at room temperature. Polymer concentration is 2.0 lbs./PBL.

Example 6

Below in Table II is a direct comparison of oil mud rheology of para-methylstyrene terpolymer isomers with other ionomeric systems. It is readily observed that the ionomeric-containing muds have markedly improved rheological performance as compared to the base control mud and that the para-methylstyrene terpolymer ionomer has significantly improved properties in comparison with the other elastomeric and thermoplastic ionomers measured under essentially the identical experimental conditions. These improved properties are sustained over a very broad temperature range.

TABLE II

COMPARISON OF PARA-METHYLSTYRENE TERPOLYMER IONOMER/OIL MUD RHEOLOGY WITH THE PRIOR ART

| Rheology (115° F.) | Control | SPS | A[1] | B[2] | C[3] | D[4] | PMS[5] |
|---|---|---|---|---|---|---|---|
| 600 | 75 | 110 | 107 | 49 | | | 148 |
| 300 | 46 | 72 | 71 | 27 | | 25 | 100 |
| 200 | 36 | 57 | | | | | 36 |
| 100 | 24 | 39 | | | | | 24 |
| 6 | 7 | 14 | | | | | 26 |
| 3 | 6 | 13 | | | | | 24 |
| 10 Sec. Gel | 8 | 18 | 26 | 4 | 12 | 9 | 28 |
| E.S. | 400 | | | | | | 600 |
| F.L. | 0.0 | 3.1 | | | | | 22.6 |
| AV | 37 | 55 | | | | | 74 |
| PV | 29 | 38 | 36 | 22 | 41 | 22 | 48 |
| YP | 17 | 34 | 35 | 5 | 27 | 3 | 52 |

[1] Turner, et al., U.S. Pat. No. 4,425,461
[2] European Patent 0072245
[3] Peiffer, et al., U.S. Pat. No. 4,537,688
[4] Turner, et al., U.S. Pat. No. 4,425,455
[5] Exp. 1 from Table I

What is claimed is:

1. An oil-based drilling mud which comprises:
   (a) a hydrocarbon liquid substantially immiscible with water;
   (b) about 1 to about 10 parts by weight of water per 100 parts by weight of the hydrocarbon liquid;

(c) about 20 to about 50 lb/bbl. of at least one emulsifier;
(d) weighting material necessary to achieve the desired density; and
(e) about 0.25 to about 6.0 lb/bbl. of a neutralized sulfonated thermoplastic terpolymer having an Mn of about 5,000 to about 200,000, said neutralized sulfonated thermoplastic polymer having about 5 to about 100 meq. of metal neutralized sulfonate groups per 100 grams of the neutralized sulfonated thermoplastic terpolymer, wherein said sulfonated thermoplastic terpolymer is a terpolymer of p-methylstyrene/metal neutralized styrene sulfonate/styrene formed by a free radical emulsion polymerization, wherein the terpolymer has 20 to 45 mole percent of p-methyl-styrene.

2. A drilling mud according to claim 1 wherein the sulfonate groups of said neutralized sulfonated thermoplastic terpolymer are neutralized with a counterion selected from the group consisting of antimony, iron, aluminum, lead and Groups IA, IIA, IB and IIB of the Periodic Table of Elements.

3. A drilling mud according to claim 1 wherein the sulfonate groups of said neutralized sulfonated thermoplastic terpolymer are neutralized with a counterion selected form the group consisting of zinc, magnesium and sodium.

4. A drilling mud according to claim 1 further including a wetting agent wherein said wetting agent is an alkylaryl sulfonate.

5. A drilling mud according to claim 1 wherein said weighting material is barite or barium sulfate.

6. A drilling mud according to claim 1 wherein the concentration level of said weighting material is sufficient to give said drilling mud a specific gravity of about 7 pounds per gallon to about 20 pounds per gallon.

7. A drilling mud according to claim 1 wherein said hydrocarbon liquid is an oil.

8. A drilling mud according to claim 1 wherein said hydrocarbon liquid is a hydrocarbon solvent.

9. A drilling mud according to claim 1 wherein said emulsifier is a magnesium or calcium soap of a fatty acid.

10. A drilling mud according to claim 1 which further includes a polar cosolvent.

11. A drilling mud according to claim 1 wherein said water is salt water.

12. A drilling mud according to claim 1 wherein the concentration of said water is about 3 to about 5 parts by weight per 100 parts by weight of said hydrocarbon liquid.

13. A drilling mud according to claim 1 wherein said hydrocarbon liquid is diesel oil.

14. A drilling mud according to claim 1 wherein said neutralized sulfonate terpolymer is a latex containing about 10 to about 60 weight percent of the neutralized sulfonate-containing terpolymer.

* * * * *